(12) United States Patent
Kim et al.

(10) Patent No.: US 8,940,450 B2
(45) Date of Patent: Jan. 27, 2015

(54) MEMBRANE ELECTRODE ASSEMBLY FOR FUEL CELL AND FUEL CELL STACK

(75) Inventors: Hee-Tak Kim, Yongin-si (KR);
Sung-Yong Cho, Yongin-si (KR);
Tae-Yoon Kim, Yongin-si (KR);
Kah-Young Song, Yongin-si (KR);
Sang-Il Han, Yongin-si (KR);
Myoung-Ki Min, Yongin-si (KR);
Geun-Seok Chai, Yongin-si (KR);
Soon-Cheol Shin, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 586 days.

(21) Appl. No.: 12/845,594

(22) Filed: Jul. 28, 2010

(65) Prior Publication Data

US 2011/0053029 A1 Mar. 3, 2011

(30) Foreign Application Priority Data

Aug. 26, 2009 (KR) ........................ 10-2009-0079466

(51) Int. Cl.
*H01M 8/04* (2006.01)
*H01M 2/02* (2006.01)
*H01M 2/08* (2006.01)
*H01M 8/24* (2006.01)
(Continued)

(52) U.S. Cl.
CPC .......... *H01M 8/0273* (2013.01); *H01M 8/1002* (2013.01); *H01M 8/1009* (2013.01); *H01M 2008/1095* (2013.01); *Y02E 60/521* (2013.01)
USPC ........... 429/481; 429/452; 429/463; 429/469; 429/483; 429/532; 429/534; 429/508

(58) Field of Classification Search
USPC ......... 429/452, 463, 469, 481, 483, 532, 534, 429/508
See application file for complete search history.

(56) References Cited

U.S. PATENT DOCUMENTS

| 2004/0091767 | A1 | 5/2004 | Zuber et al. |
| 2004/0214071 | A1 * | 10/2004 | Barnett et al. .................. 429/44 |

(Continued)

FOREIGN PATENT DOCUMENTS

| JP | 2005-160031 | 6/2005 |
| JP | 2005-160035 | 6/2005 |

(Continued)

OTHER PUBLICATIONS

Dictionary.com definition for periphery, Dec. 11, 2013: http://dictionary.reference.com/browse/periphery?s=t.*

(Continued)

*Primary Examiner* — Eugenia Wang
(74) *Attorney, Agent, or Firm* — Robert E. Bushnell, Esq.

(57) ABSTRACT

A membrane electrode assembly for a fuel cell that secures a flow path of a separator while preventing generation of a pin-hole. The membrane electrode assembly includes an electrolyte membrane for a fuel cell, a microporous layer that is disposed at both surfaces of the electrolyte membrane, a backing layer that is disposed on the microporous layer, and a circumferential edge protective layer that is disposed at an circumferential edge of the electrolyte membrane. An end portion of the microporous layer is positioned further inside of the membrane electrode assembly than an end portion of the backing layer. The circumferential edge protective layer is inserted between the backing layer and the electrolyte membrane.

18 Claims, 11 Drawing Sheets

(51) Int. Cl.
  *H01M 2/20* (2006.01)
  *H01M 8/10* (2006.01)
  *H01M 2/14* (2006.01)
  *H01M 4/36* (2006.01)
  *H01M 4/62* (2006.01)
  *H01M 8/02* (2006.01)

(56) References Cited

U.S. PATENT DOCUMENTS

| | | | |
|---|---|---|---|
| 2005/0058870 A1* | 3/2005 | Healy et al. | 429/30 |
| 2006/0099486 A1* | 5/2006 | Sompalli et al. | 429/44 |
| 2007/0298302 A1* | 12/2007 | Oschmann | 429/33 |
| 2009/0197137 A1 | 8/2009 | Lee et al. | |
| 2009/0246592 A1* | 10/2009 | Kinoshita | 429/33 |
| 2010/0000679 A1 | 1/2010 | Han et al. | |
| 2010/0003400 A1 | 1/2010 | Tanuma | |
| 2010/0038020 A1 | 2/2010 | Hori et al. | |
| 2011/0045380 A1 | 2/2011 | Suzuki et al. | |

FOREIGN PATENT DOCUMENTS

| | | |
|---|---|---|
| JP | 2005-160038 | 6/2005 |
| JP | 2005-252644 | 9/2005 |
| JP | 2006-118262 | 5/2006 |
| JP | 2006-338939 | 12/2006 |
| JP | 2006-346018 | 12/2006 |
| JP | 2007-042348 | 2/2007 |
| JP | 2007109576 A | 4/2007 |
| JP | 2008-159320 | 7/2008 |
| KR | 1020040028590 | 4/2004 |
| KR | 1020090085957 | 8/2009 |

OTHER PUBLICATIONS

Korean Office Action issued by KIPO dated Apr. 20, 2011, corresponding to Korean Patent Application No. 10-2009-0079466, together with Request for Entry.

* cited by examiner

MEMBRANE ELECTRODE ASSEMBLY FOR FUEL CELL AND FUEL CELL STACK

CLAIM OF PRIORITY

This application makes reference to, incorporates into this specification the entire contents of, and claims all benefits accruing under 35 U.S.C. §119 from an application earlier filed in the Korean Intellectual Property Office on Aug. 26, 2009, and there duly assigned Serial No. 10-2009-0079466.

BACKGROUND OF THE INVENTION

1. Field of the Invention

The described technology relates generally to a fuel cell stack and a membrane electrode assembly. More particularly, the described technology relates generally to a fuel cell stack and a membrane electrode assembly having a circumferential edge protective layer.

2. Description of the Related Art

As is well known, a fuel cell is an electrical generator system that converts chemical energy of hydrogen that is contained in a hydrocarbon-based fuel and oxygen that is separately supplied, to electrical energy.

The fuel cell is largely classified into a polymer electrolyte membrane fuel cell and a direct oxidation fuel cell.

The polymer electrolyte membrane fuel cell includes a fuel cell main body that is called a stack and has a structure that generates electrical energy through an electrochemical reaction of hydrogen that is supplied from a reformer and oxygen that is supplied by operating an air pump or a fan.

Unlike the polymer electrolyte membrane fuel cell, the direct oxidation fuel cell directly receives fuel without using hydrogen, and has a structure that generates electrical energy by an electrochemical reaction of hydrogen that is contained in the fuel and oxygen that is separately supplied.

The above information disclosed in this Background section is only for enhancement of understanding of the background of the described technology and therefore it may contain information that does not form the prior art that is already known in this country to a person of ordinary skill in the art.

SUMMARY OF THE INVENTION

The described technology has been made in an effort to provide an improved membrane electrode assembly (MEA) and an improved fuel cell stack.

The described technology has been made in a further effort to provide an MEA and a fuel cell stack having advantages of securing a flow path that is formed in a separator while preventing deterioration of an electrolyte membrane.

An exemplary embodiment of the present invention provides an MEA for a fuel cell, including an electrolyte membrane for a fuel cell, a microporous layer that is disposed at both surfaces of the electrolyte membrane, a backing layer that is disposed on the microporous layer, and a circumferential edge protective layer that is disposed at an circumferential edge of the electrolyte membrane. An end portion of the microporous layer is positioned further to the inside of the MEA than an end portion of the backing layer, and the circumferential edge protective layer is inserted between the backing layer and the electrolyte membrane.

A side end surface of the circumferential edge protective layer and a side end surface of the microporous layer may contact each other.

The side end surface of the circumferential edge protective layer and the side end surface of the microporous layer may be disposed opposite to each other.

The backing layer may be disposed to cover the end portion of the microporous layer.

An opening may be formed at a center of the circumferential edge protective layer, and the microporous layer may be inserted into the opening.

A catalytic layer may be formed between the electrolyte membrane and the microporous layer. The catalytic layer may be inserted into an opening that is formed at the center of the circumferential edge protective layer. The thickness of the circumferential edge protective layer may be equal to or larger than the sum of thicknesses of the catalytic layer and the microporous layer.

A cathode catalytic layer may be formed on a first surface of the electrolyte membrane, and an anode catalytic layer may be formed on a second and opposite surface of the electrolyte membrane. The cathode catalytic layer and the circumferential edge protective layer may be overlapped.

The edge of the backing layer may directly contact the circumferential edge protective layer.

Another embodiment of the present invention provides a fuel cell stack including unit cells in which MEAs are disposed at a center and separators are positioned closely adjacent to both sides of the MEAs, and a pressing plate that presses and supports the unit cells. Each MEA includes an electrolyte membrane for a fuel cell, a microporous layer that is disposed at both surfaces of the electrolyte membrane, a backing layer that is disposed on the microporous layer, and a circumferential edge protective layer that is disposed at a circumferential edge of the electrolyte membrane. An end portion of the microporous layer is positioned further to the inside of the MEA than an end portion of the backing layer. The circumferential edge protective layer is inserted between the backing layer and the electrolyte membrane.

A side end surface of the circumferential edge protective layer and a side end surface of the microporous layer may contact each other.

The side end surface of the circumferential edge protective layer and the side end surface of the microporous layer may be disposed opposite to each other.

The backing layer may be disposed to cover the end portion of the microporous layer.

An opening may be formed at a center of the circumferential edge protective layer, and the microporous layer may be inserted into the opening.

A catalytic layer may be formed between the electrolyte membrane and the microporous layer, and the catalytic layer may be inserted into an opening that is formed at the center of the circumferential edge protective layer.

The thickness of the circumferential edge protective layer may be equal to or larger than the sum of thicknesses of the catalytic layer and the microporous layer.

A cathode catalytic layer may be formed on a first surface of the electrolyte membrane, and an anode catalytic layer may be formed on a second and opposite surface of the electrolyte membrane. The cathode catalytic layer and the circumferential edge protective layer may be disposed to be partially overlapped.

The edge of the backing layer may directly contact the circumferential edge protective layer.

As described above, according to the present invention, by forming a circumferential edge protective layer, deterioration of an electrolyte membrane can be prevented and a gas diffusion layer can be prevented from blocking a flow path by being inserted into the flow path of a separator.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF REFERENCE NUMERALS INDICATING PRIMARY ELEMENTS IN THE DRAWINGS

100: fuel cell stack
10: unit cell
13, 15: separator
13a: hydrogen flow path
15a: air passage
20: membrane electrode assembly
21: electrolyte membrane
23, 24: microporous layer
23a, 24a: mounting space
25, 26: backing layer
27, 28: gas diffusion layer
30: pressing plate
71: circumferential edge protective layer
71a: opening
72, 73: catalytic layer

DETAILED DESCRIPTION OF THE INVENTION

In a fuel cell, a stack is formed by stacking several to several tens of unit cells each including a membrane electrode assembly (MEA) and a separator.

The MEA includes a polymer electrolyte membrane, a pair of catalytic layers that are installed at both surfaces of the polymer electrolyte membrane, and a gas diffusion layer that is installed at the outside of the catalytic layer.

The catalytic layer is not formed in the entire electrolyte membrane but in only an inner active area, and the gas diffusion layer is formed to be wider than the catalytic layer to contact the electrolyte membrane.

In this case, because an edge portion of the gas diffusion layer digs into the electrolyte membrane, and in this portion deterioration is accelerated and thus a pin-hole may be generated in the electrolyte membrane, or in a contact portion between the electrolyte membrane in which the catalytic layer is not coated and the gas diffusion layer, as a gas is permeated and a pin-hole may be generated in the electrolyte membrane by hydration (—OH) radicals generated when hydrogen and oxygen meet. When a pin-hole is generated in the electrolyte membrane, performance of a fuel cell may be deteriorated, and while operating the fuel cell, power generation may be discontinued.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Figure 1:
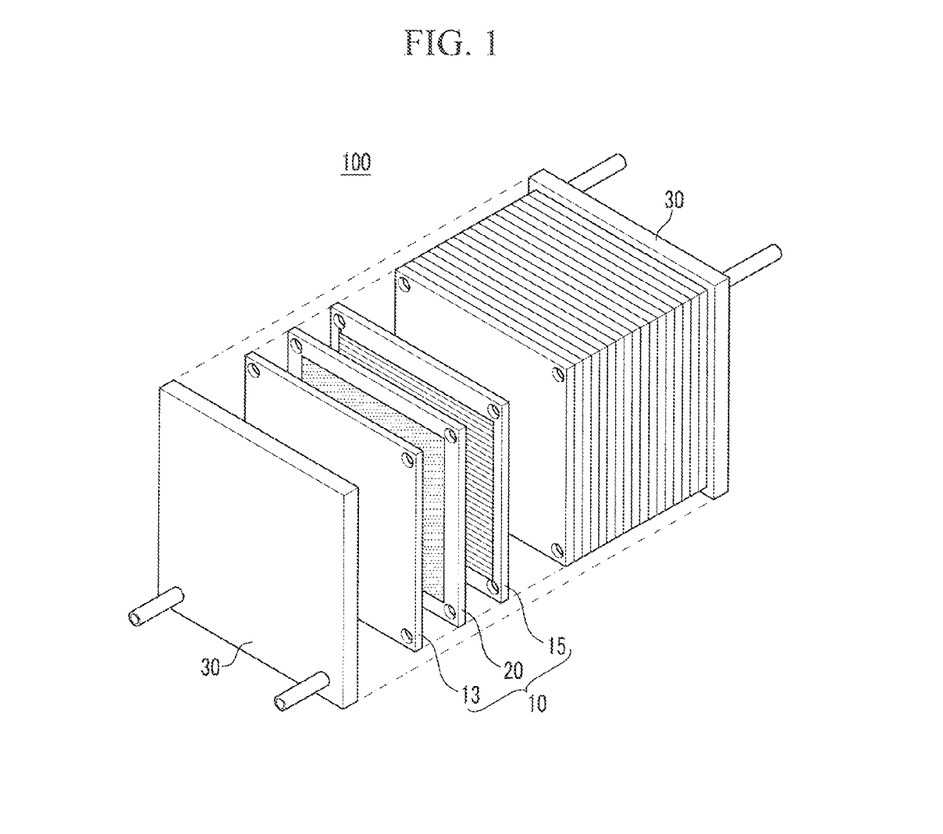
FIG. 1 is an exploded oblique view illustrating a fuel cell stack constructed as a first exemplary embodiment according to the principles of the present invention.
Figure 2:
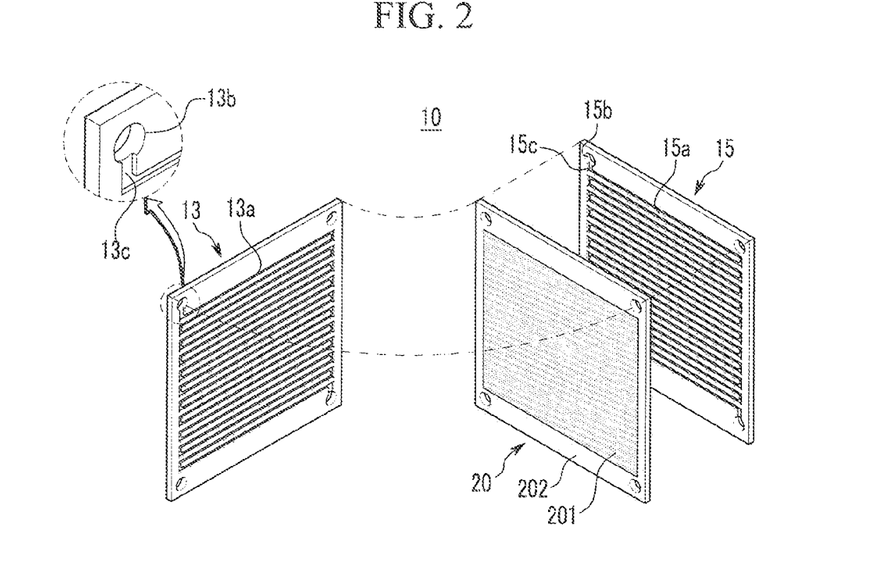
FIG. 2 is an exploded oblique view illustrating a unit cell constructed as the first exemplary embodiment according to the principles of the present invention.

FIG. 1 is an exploded oblique view illustrating a configuration of a fuel cell stack constructued as a first exemplary embodiment according to the principles of the present invention, and FIG. 2 is an exploded oblique view illustrating a unit cell constructued as the first exemplary embodiment according to the principles of the present invention.

Referring to FIGS. 1 and 2, a fuel cell stack 100 constructued as the present exemplary embodiment includes a plurality of unit cells 10 that generate electrical energy by electrochemically reacting fuel and oxygen.

In the present exemplary embodiment, a plurality of unit cells 10 are provided, and by continuously disposing unit cells 10, fuel cell stack 100 can be formed in a set structure of unit cells 10.

The fuel that is used in fuel cell stack 100 is a liquid or gas fuel containing hydrogen, such as methanol, ethanol, liquefied petroleum gas (LPG), liquefied natural gas (LNG), gasoline, and butane gas. In this case, fuel cell stack 100 constructued as the present exemplary embodiment may use, as a fuel, pure hydrogen or hydrogen that is cracked from a liquid or gas fuel through a general reformer. In this case, fuel cell stack 100 is formed with a polymer electrolyte membrane fuel cell method that generates electrical energy by a reaction of hydrogen and oxygen by unit cell 10.

Alternatively, fuel cell stack 100 constructed as the present exemplary embodiment can be formed with a direct oxidation fuel cell method that generates electrical energy through a direct reaction of liquid or gas fuel and oxygen in unit cell 10.

The fuel cell stack 100 constructed as the present exemplary embodiment can use pure oxygen that reacts with the fuel and that is stored in a separate storage means, and may directly use air containing oxygen.

In fuel cell stack 100, unit cell 10 is formed by disposing a membrane electrode assembly (hereinafter, referred to as "MEA") 20 at a center and closely disposing separators 13 and 15 at both surfaces of MEA 20. A plurality of unit cells 10 are provided and thus fuel cell stack 100 having a stacked structure of the present exemplary embodiment is formed.

At the outermost side of fuel cell stack 100, pressing plates 30 that closely contact the plurality of unit cells 10 are positioned. The present invention is, however, not limited thereto. Fuel cell stack 100 can be formed so that separators 13 and 15 are positioned at the outermost side of the plurality of unit cells 10 to function as the pressing plate without pressing plate 30.

In the fuel cell stack 100 constructed as the present exemplary embodiment, separators 13 and 15 are positioned closely adjacent to MEA 20 disposed between separators 13 and 15, and a hydrogen flow path 13a and an air passage 15a are formed at each of both sides of MEA 20, respectively. Hydrogen flow path 13a is formed at an anode side of MEA 20 and air passage 15a is positioned at a cathode side of MEA 20, and this is described in detail later.

Here, hydrogen flow path 13a and air passage 15a are formed in a straight line form at a predetermined interval in separators 13 and 15, respectively, and are formed in an approximately zigzag form by alternatively connecting both ends thereof. A disposition structure of hydrogen flow path 13a and air passage 15a is not limited thereto.

MEA 20 that is interposed between the both side separators 13 and 15 has an active area 201 that has a predetermined area and in which a reaction occurs, and an inactive area 202 that is adjacent to an edge portion of active area 201. In inactive area 202, a gasket (not shown) that seals an edge portion of a closely contacting surface of each one of separators 13 and 15 corresponding to active area 201 is installed.

Figure 3:
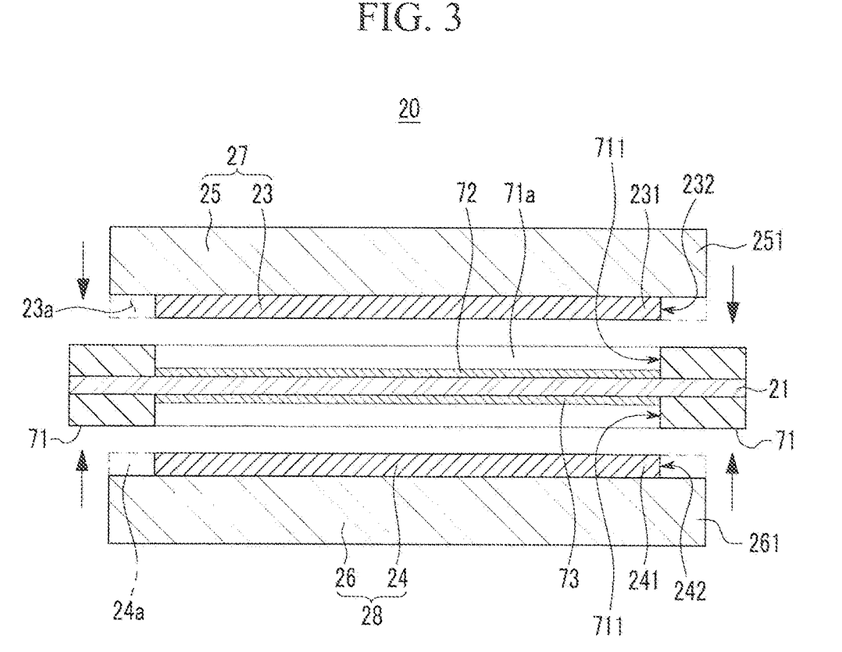
FIG. 3 is a cross-sectional view illustrating an MEA constructed as the first exemplary embodiment according to the principles of the present invention.
Figure 4:
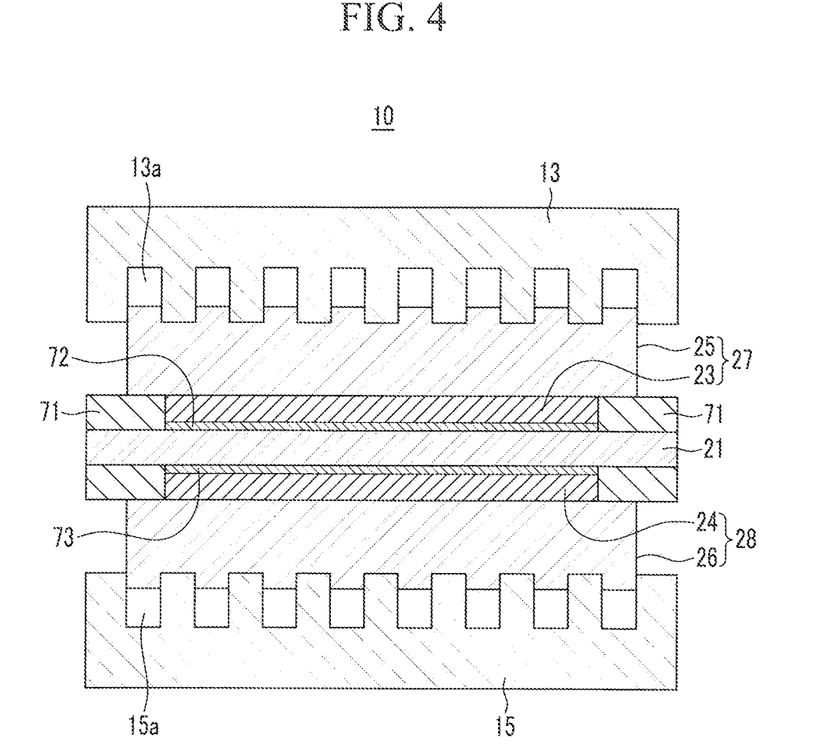
FIG. 4 is a cross-sectional view illustrating a unit cell constructed as the first exemplary embodiment according to the principles of the present invention.

FIG. 3 is a cross-sectional view illustrating an MEA constructed as the first exemplary embodiment according to the principles of the present invention, and FIG. 4 is a cross-sectional view illustrating a unit cell MEA constructed as the first exemplary embodiment according to the principles of the present invention.

Referring to FIGS. 3 and 4, MEA 20 has a structure in which an electrolyte membrane 21 is disposed at a center, and an anode and a cathode are disposed at respective side surfaces of electrolyte membrane 21.

Electrolyte membrane 21 is made of a solid polymer electrolyte having a thickness of approximately 15 μm to 50 μm to allow an ion exchange that moves hydrogen ions that are generated in an anode catalytic layer 72 to a cathode catalytic layer 73.

The anode that forms one surface of MEA 20 is a portion that receives hydrogen gas through hydrogen flow path 13a that is formed between separator 13 and MEA 20, and includes anode catalytic layer 72 and an anode gas diffusion layer 27. Anode gas diffusion layer 27 includes an anode microporous layer (MPL) 23 and an anode backing layer 25 that are formed at an outside of anode catalytic layer 72. That is, anode MPL 23 and anode backing layer 25 are formed at a first side of anode catalytic layer 72 which is different from and opposite to a second side of anode catalytic layer 72 which is facing electrolyte membrane 21.

The cathode that forms the other surface of MEA 20 is a portion that receives oxygen gas through air passage 15a that is formed between separator 15 and MEA 20, and includes cathode catalytic layer 73 and a cathode gas diffusion layer 28. Cathode gas diffusion layer 28 includes a cathode MPL 24 and a cathode backing layer 26 that are formed at an outside of cathode catalytic layer 73. That is, cathode MPL 24 and cathode backing layer 26 are formed at a first side of cathode catalytic layer 73 which is different from and opposite to a second side of cathode catalytic layer 73 which is facing electrolyte membrane 21.

Anode backing layer 25 and cathode backing layer 26 can be formed with carbon paper or carbon cloth, and has holes at the inside thereof.

Anode MPL 23 and cathode MPL 24 can be made of graphite, carbon nanotubes (CNT), fullerene $C_{60}$, active carbon, or carbon nanohorns, and have a plurality of smaller holes than those that are formed in backing layers 25 and 26. MPLs 23 and 24 perform a function of further dispersing gas and delivering the gas to catalytic layers 72 and 73.

MPLs 23 and 24 constructed as the present exemplary embodiment are positioned further inside than backing layers 25 and 26. That is, MPLs 23 and 24 include end portions (or circumferential edge portions) 231 and 241 that are positioned closer to a longitudinal center axis of MEA 20 than end portions (or circumferential edge portions) 251 and 261 of backing layers 25 and 26. Backing layers 25 and 26 cover end portions 231 and 241 of MPLs 23 and 24. Because MPLs 23 and 24 are installed at the same position as that of catalytic layers 72 and 73, backing layers 25 and 26 are protruded to the outside of MEA 20 further than MPLs 23 and 24. In this case, end portions 231 and 241 of MPLs 23 and 24 are positioned further inside than end portions 251 and 261 of backing layer 25 and 26, and thus mounting spaces 23a and 24a are formed between the edges of backing layers 25 and 26 and electrolyte membrane 21.

A part of a circumferential edge protective layer 71 is inserted into mounting spaces 23a and 24a, and a part of circumferential edge protective layer 71 is protruded to the outside of backing layers 25 and 26. Accordingly, circumferential edge protective layer 71 directly contacts backing layers 25 and 26.

A side end surface 711 of circumferential edge protective layer 71 is installed to contact and opposite to side end surfaces 232 and 242 of MPLs 23 and 24. Backing layers 25 and 26 cover parts of MPLs 23 and 24 and circumferential edge protective layer 71. However, the present invention is not limited thereto, and the side end surface of circumferential edge protective layer 71 may be installed opposite to and separated from MPLs 23 and 24.

Circumferential edge protective layer 71 and MPLs 23 and 24 are installed to not be overlapped, and thus the anode or the cathode can be prevented from protruding to the outside of MEA 20 due to circumferential edge protective layer 71.

The thickness of circumferential edge protective layer 71 is formed to be equal to or greater than the sum of thicknesses of MPLs 23 and 24 and catalytic layers 72 and 73.

Further, circumferential edge protective layer 71 is connected along the edge of electrolyte membrane 21 to be formed in a ring shape, and an opening 71a is formed at the center thereof. Catalytic layers 72 and 73 and MPLs 23 and 24 are inserted into opening 71a. Circumferential edge protective layer 71 is formed in an approximately quadrangular ring shape, but the present invention is not limited thereto, and circumferential edge protective layer 71 can be formed with a circular shape or other shapes.

According to the present exemplary embodiment, when circumferential edge protective layer 71 is formed, backing layers 25 and 26 are not further protruded to the outside of membrane electrode assembly 20 and thus backing layers 25 and 26 can be prevented from blocking flow paths 13a and 15a that are formed in separators 13 and 15. That is, in membrane electrode assembly 20 constructed as the present exemplary embodiment, circumferential edge protective layers 71 have an outer diameter that is larger than other components of MEA 20, such that circumferential edge protective layers 71, rather than backing layers 25 and 26, are protruded to the outside of membrane electrode assembly 20.

When the circumferential edge protective layer is formed at the outer side of the electrolyte membrane that does not contact the catalytic layer, and the gas diffusion layer including the MPL and the backing layer is formed to be larger than the catalytic layer, the circumferential edge protective layer and the gas diffusion layer are overlapped. In this state, when a pressing force for fastening a cell is applied, the gas diffusion layer and the separator closely contact each other, the gas diffusion layer of an overlapped portion digs into the inside of a flow path that is formed in the separator, and thus a flow path becomes narrow or is blocked.

Figure 9A:
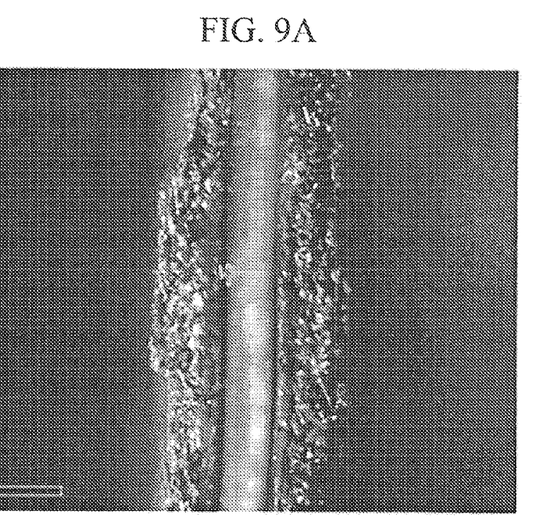
FIG. 9A is a picture illustrating an MEA constructed as Comparative Example 1.

FIG. 9A is a picture illustrating an MEA constructed as a Comparative Example 1. In the MEA of Comparative Example 1, the thickness of the electrolyte membrane is 25 μm, the thickness of the catalytic layer is 8 μm, and the thickness of the circumferential edge protective layer is 70 μm. The gas diffusion layer including the MPL and the backing layer protrudes further by 2.5 mm to the outside of the MEA than the catalytic layer, and is thus overlapped by 2.5 mm with the circumferential edge protective layer.

As shown in FIG. 9A, an overlapped portion of the gas diffusion layer and the circumferential edge protective layer has a larger thickness than other portions, and thus penetrates into the inside of a flow path by a protruded height.

Figure 5:
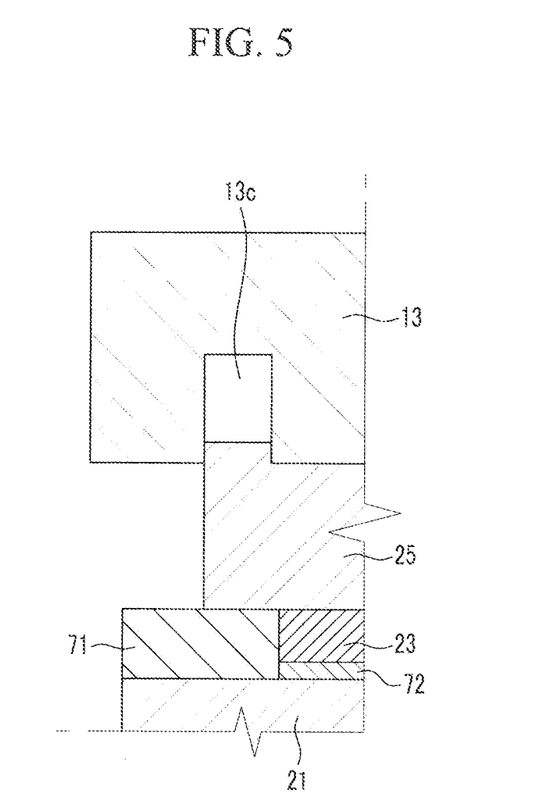
FIG. 5 is a partially cross-sectional view illustrating the unit cell constructed as the first exemplary embodiment according to the principles of the present invention.

Particularly, flow path introduction portions 13c and 15c that connect manifold holes 13b and 15b and flow paths 13a and 15a are positioned at an outside, that is, an edge portion, of separators 13 and 15 to overlap a position of circumferential edge protective layer 71. Due to circumferential edge protective layer 71, the gas diffusion layer blocks flow path introduction portions 13c and 15c, or the flow path area is reduced. If the flow path introduction portions are blocked by the gas diffusion layer or become narrow, the fuel or an oxidizing agent is not supplied to the flow path, thereby a power generation efficiency is undesirably deteriorated.

Figure 9B:
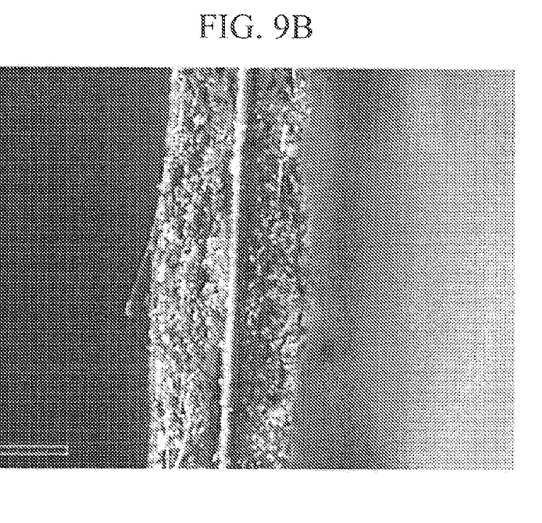
FIG. 9B is a picture illustrating an MEA constructed as the first exemplary embodiment according to the principles of the present invention.

FIG. 9B is a picture illustrating an MEA, especially the anode gas diffusion layer 27 and the cathode gas diffusion layer 28 of MEA excluding the electrolyte membrane 21 and the catalytic layers 72 and 73, constructed as the first exemplary embodiment of the present invention. In the MEA constructed as the present exemplary embodiment, the thickness of electrolyte membrane 21 is 25 μm, the thickness of catalytic layers 72 and 73 is 8 μM, and the thickness of circumferential edge protective layer 71 is 70 μm. First, catalytic layers 72 and 73 having an area of 50×50 mm are formed in electrolyte membrane 21, and a circumferential edge protection film having an opening 71a of a size of 50×50 mm is installed on catalytic layers 72 and 73. MPLs 23 and 24 having an area of 50×50 mm are inserted into opening 71a, and backing layers 25 and 26 having an area of 55×55 mm are formed on MPLs 23 and 24.

As shown in FIG. 9B, according to the present exemplary embodiment, because end portions 231 and 241 of MPLs 23 and 24 are positioned further inside of MEA 20 than end portions 251 and 261 of backing layers 25 and 26, and an end portion 712 of circumferential edge protective layer 71 is positioned further outside than end portions 251 and 261 of backing layers 25 and 26, circumferential edge protective layer 71 and MPL 23 and 24 do not overlap, and thus the thickness of MEA 20 can be prevented from increasing due to circumferential edge protective layer 71. Further, if end portions of gas diffusion layers 27 and 28 dig into electrolyte membrane 21, a pin-hole will be undesirably generated, and electrolyte membrane 21 will be deteriorated. By forming circumferential edge protective layer 71, the generation of the pin-hole can be prevented, and acceleration of deterioration of electrolyte membrane 21 can be prevented.

In addition, if an overlapped portion of the gas diffusion layer and the circumferential edge protective layer penetrates into the inside of flow paths 13a and 15a, the flow path area is reduced and the diffusion resistance can be increased. But, as shown in FIG. 5, in flow path introduction portions 13c and 15c that connect manifold holes 13b and 15b and flow paths 13a and 15a, due to circumferential edge protective layer 71 constructed as the present exemplary embodiment, blocking of the flow path introduction portion by the gas diffusion layer can be prevented, and diffusion resistance increases can be prevented.

Figure 10:
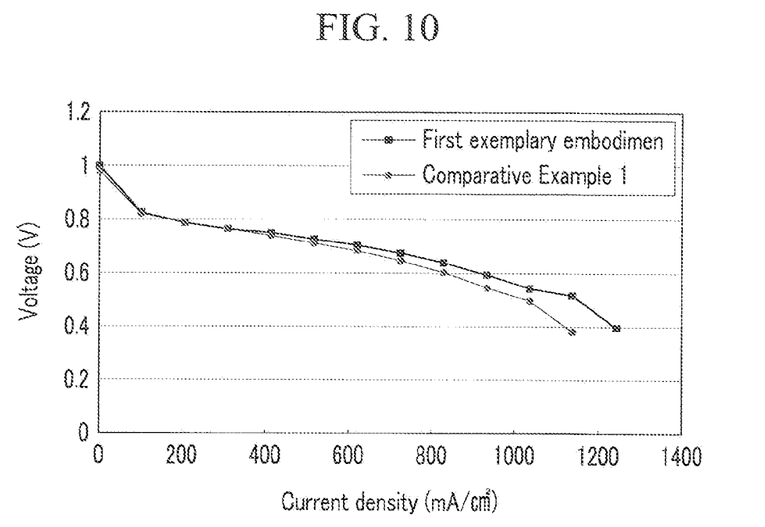
FIG. 10 is a graph illustrating voltage versus current density of a fuel cell stack constructed as the first exemplary embodiment according to the principles of the present invention, and a fuel cell stack constructed as Comparative Example 1.

FIG. 10 is a graph illustrating voltage versus current density of a fuel cell stack constructed as the first exemplary embodiment of the present invention, and a fuel cell stack constructed as the Comparative Example 1.

Air and hydrogen that are humidified to 80% are used as fuel, and the operation temperature is 60° C. Cathode stoichiometry is 2.5, and anode stoichiometry is 1.2.

As shown in FIG. 10, the fuel cell stack constructed as the first exemplary embodiment has a larger output voltage at a high current density than Comparative Example 1. This is because diffusion resistance of the fuel cell stack constructed the first exemplary embodiment is lower than that of Comparative Example 1.

Figure 6:
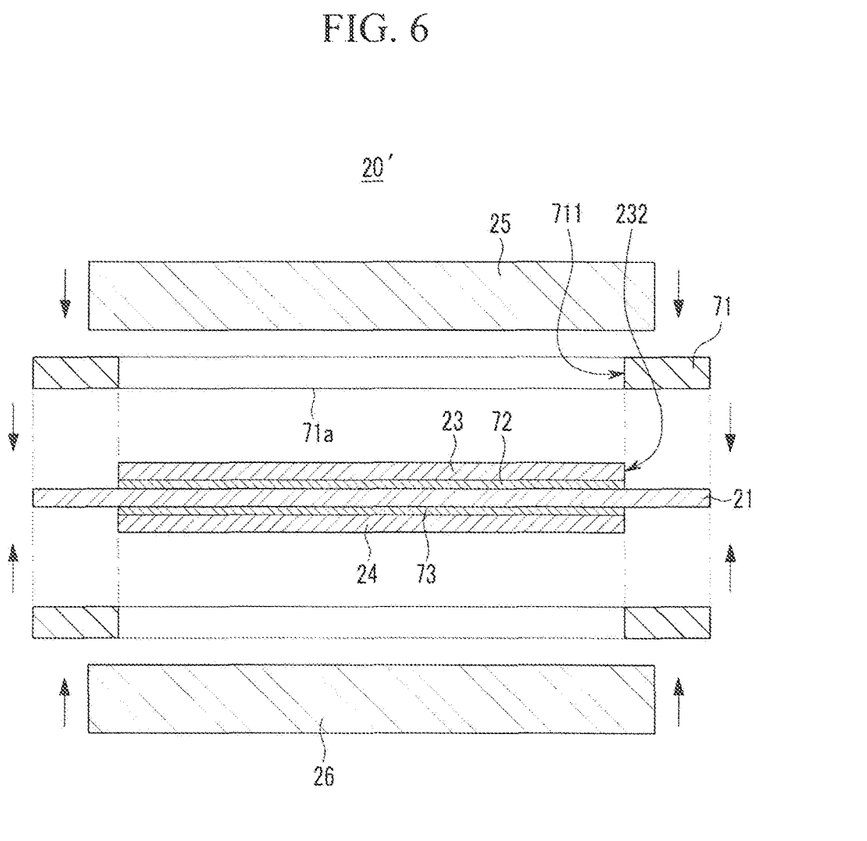
FIG. 6 is a cross-sectional view illustrating an MEA constructed as a second exemplary embodiment according to the principles of the present invention.

FIG. 6 is a cross-sectional view illustrating an MEA constructed as a second exemplary embodiment according to the principles of the present invention.

An MEA 20' of a fuel cell stack constructed as the present exemplary embodiment includes an electrolyte membrane 21, catalytic layers 72 and 73 that are disposed at respective side surfaces of electrolyte membrane 21, gas diffusion layers 27 and 28 that are disposed on catalytic layers 72 and 73 and that include MPLs 23 and 24 and backing layers 25 and 26, and a circumferential edge protective layer 71 that is inserted between electrolyte membrane 21 and backing layers 25 and 26 at the edge of electrolyte membrane 21.

In MEA 20', electrolyte membrane 21 having a thickness of 25 μm is prepared, and catalytic layers 72 and 73 having a thickness of 8 μm are formed at both surfaces of electrolyte membrane 21. MPLs 23 and 24 having a thickness of 20 μm are formed on catalytic layers 72 and 73, and circumferential edge protective layer 71 having a thickness 45 μm is bonded to the edge of electrolyte membrane 21. The area of catalytic layers 72 and 73 is 50×50 mm, and the area of an opening 71a of circumferential edge protective layer 71 is 50×50 mm. Further, backing layers 25 and 26 having a thickness of 300 μm and the area of 55×55 mm are formed on MPLs 23 and 24 and circumferential edge protective layer 71.

In the present exemplary embodiment, MPLs 23 and 24 are first formed, circumferential edge protective layer 71 is formed at the outside of MPLs 23 and 24, and MPLs 23 and 24 are inserted into opening 71a of circumferential edge protective layer 71. Circumferential edge protective layer 71 and MPLs 23 and 24 do not overlap, and an inner side surface 711 of opening 71a and a side end surface 232 of MPLs 23 and 24 contact each other.

As in the present exemplary embodiment, after MPLs 23 and 24 are formed, if circumferential edge protective layer 71 is formed at the outside along end portions of MPLs 23 and 24, MPLs 23 and 24 and circumferential edge protective layer 71 can be easily formed to not overlap.

Figure 7:
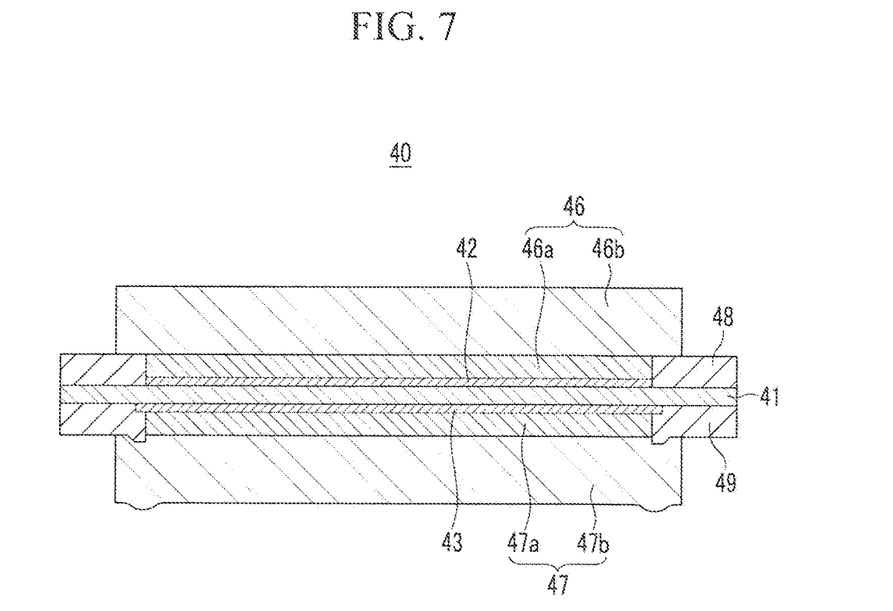
FIG. 7 is a cross-sectional view illustrating an MEA constructed as a third exemplary embodiment according to the principles of the present invention.

FIG. 7 is a cross-sectional view illustrating an MEA constructed as a third exemplary embodiment according to the principles of the present invention.

Referring to FIG. 7, an MEA 40 of a fuel cell stack according to the present exemplary embodiment includes an electrolyte membrane 41, catalytic layers 42 and 43 that are disposed at both side surfaces of electrolyte membrane 41, gas diffusion layers 46 and 47 that are disposed on catalytic layers 42 and 43 and that include MPLs 46a and 47a and backing layers 46b and 47b, and a circumferential edge protective layer 48 that is inserted between electrolyte membrane 21 and backing layers 46b and 47b at the edge of electrolyte membrane 21.

In a process of manufacturing MEA 40 according to the present exemplary embodiment, electrolyte membrane 41 having a thickness of 25 µm is prepared, and catalytic layers 42 and 43 having a thickness of 8 µm and an area of 51×51 mm are formed at both surfaces thereof. Circumferential edge protective layer 48 having a thickness of 45 µm is formed at the outside of catalytic layers 42 and 43, an opening of anode circumferential edge protective layer 48 has an area of 51×51 mm, and an opening of a cathode circumferential edge protective layer 49 has an area of 50×50 mm. Accordingly, cathode circumferential edge protective layer 49 and cathode catalytic layer 43 are partially overlapped.

Anode MPL 46a having a thickness of 20 µm and an area of 50×50 mm is formed on anode catalytic layer 42, and cathode MPL 47a having a thickness of 20 µm and the area of 51×51 mm is formed on cathode catalytic layer 43.

Therefore, anode MPL 46a and cathode MPL 47a are inserted into openings of anode circumferential edge protective layer 48 and cathode circumferential edge protective layer 49, respectively, and MPLs 46a and 47a and circumferential edge protective layers 48 and 49 are not overlapped.

Backing layers 46b and 47b having a thickness of 300 µm and an area of 55×55 mm are formed on MPLs 46a and 47a and circumferential edge protective layers 48 and 49.

As in the present exemplary embodiment, if the size of the opening of the cathode circumferential edge protective layer is formed to be smaller than that of the opening of the anode circumferential edge protective layer, an end portion of the cathode circumferential edge protective layer is positioned inside than that of the anode circumferential edge protective layer, thereby preventing a carbon corrosion phenomenon due to application of excessive pressure.

Figure 8:
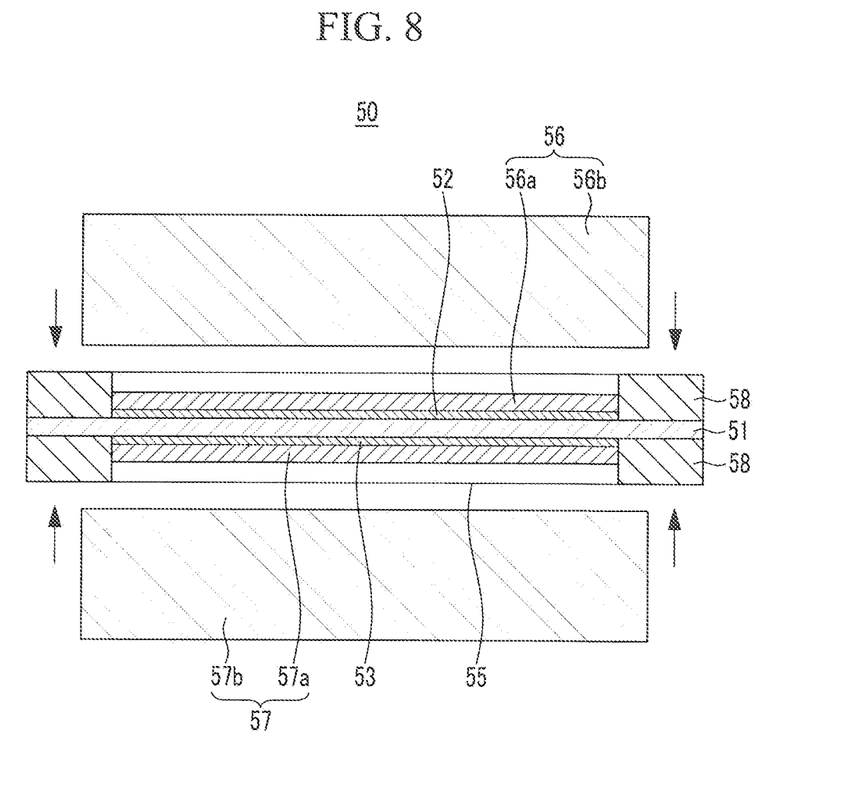
FIG. 8 is a cross-sectional view illustrating an MEA constructed as a fourth exemplary embodiment according to the principles of the present invention.

FIG. 8 is a cross-sectional view illustrating an MEA constructed as a fourth exemplary embodiment according to the principles of the present invention.

Referring to FIG. 8, an MEA 50 of a fuel cell stack constructed as the present exemplary embodiment includes an electrolyte membrane 51, catalytic layers 52 and 53 that are disposed at both side surfaces of electrolyte membrane 51, gas diffusion layers 56 and 57 that are disposed on catalytic layers 52 and 53 and that include MPLs 56a and 57a and backing layers 56b and 57b, and a circumferential edge protective layer 58 that is inserted between electrolyte membrane 51 and backing layers 56b and 57b at the edge of electrolyte membrane 51.

In a process of manufacturing MEA 40 according to the present exemplary embodiment, electrolyte membrane 51 having a thickness of 25 µm is prepared, and catalytic layers 52 and 53 having a thickness of 8 µm and an area of 50×50 mm are formed at both surfaces of electrolyte membrane 51. At the outside of catalytic layers 52 and 53, circumferential edge protective layer 58 having a thickness of 70 µm is bonded to the edge of electrolyte membrane 51. An area of an opening that is formed at the center of the circumferential edge protective layer 58 is 50 mm×50 mm. Further, MPLs having a thickness of 40 µm are inserted into the opening of the circumferential edge protective layer, and backing layers having an area of 55 mm×55 mm and a thickness of 300 µm are formed on the circumferential edge protective layer.

In the present exemplary embodiment, the thickness of the circumferential edge protective layer is formed to be larger than that of the circumferential edge protective layer according to the first exemplary embodiment, and the thickness of the backing layer is also formed larger than that of the backing layer according to the first exemplary embodiment. The MPL is inserted into the opening of the circumferential edge protective layer, and the circumferential edge protective layer and the MPL are not overlapped.

In Comparative Example 2, catalytic layers 52 and 53 having a thickness of 8 µm and an area of 50×50 mm are formed at both surfaces of electrolyte membrane 51 having a thickness of 25 µm. At the outside of catalytic layers 52 and 53, circumferential edge protective layer 58 having a thickness of 70 µm is bonded to the edge of electrolyte membrane 51. The area of the opening that is formed at the center of circumferential edge protective layer 58 is 50 mm×50 mm. Further, an MPL having an area of 55 mm×55 mm and a thickness of 40 µm is installed on circumferential edge protective layer 58, and a backing layer having an area of 55 mm×55 mm and a thickness of 300 µm is formed on the MPL.

Further, in the fuel cell stack of Comparative Example 2, the area of an opening of the circumferential edge protective layer is smaller than that of the MPL, and the circumferential edge protective layer and the MPL are partially overlapped.

Figure 11:
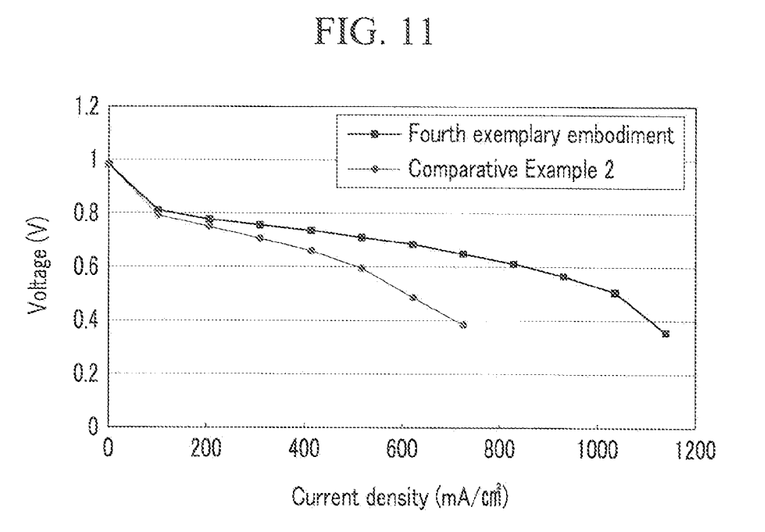
FIG. 11 is a graph illustrating voltage versus current density of a fuel cell stack constructed as the fourth exemplary embodiment according to the principles of the present invention, and a fuel cell stack constructed as Comparative Example 2.

FIG. 11 is a graph illustrating voltage versus current density of the fuel cell stack constructed as the fourth exemplary embodiment of the present invention, and the fuel cell stack constructed as Comparative Example 2.

As shown in FIG. 11, the fuel cell stack constructed as the fourth exemplary embodiment has a larger output voltage at a high current density than Comparative Example 2. Particularly, when a circumferential edge protective layer of 70 µm is applied, the backing layer is much more inserted into a flow path and thus the voltage is largely reduced.

Figure 12:
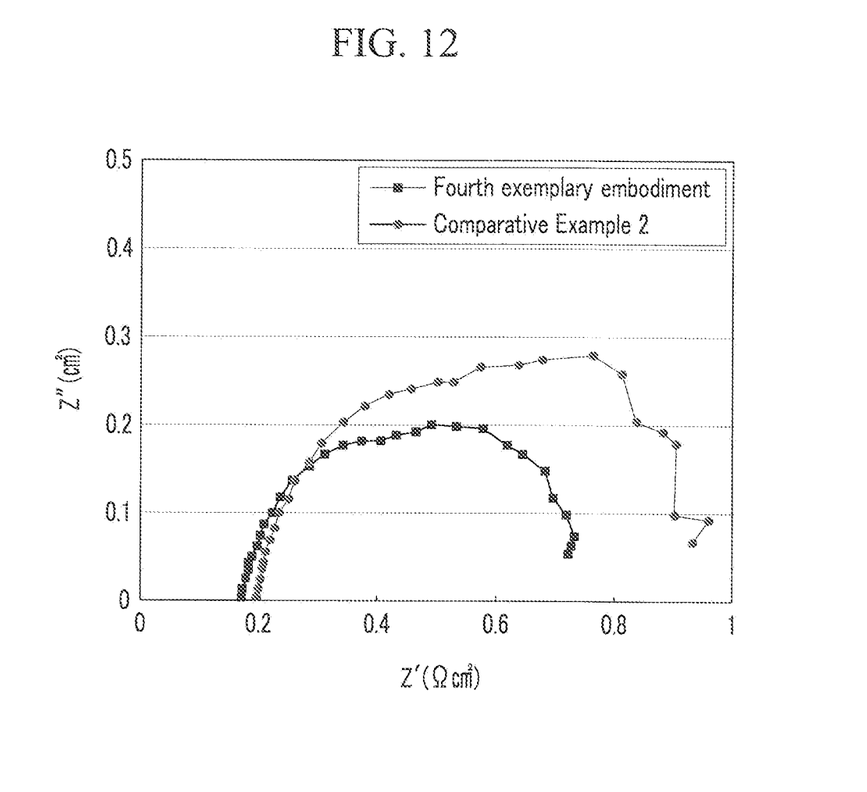
FIG. 12 is a graph illustrating an impedance of a fuel cell stack constructed as the fourth exemplary embodiment according to the principles of the present invention, and a fuel cell stack constructed as Comparative Example 2.

FIG. 12 is a graph illustrating impedance of the fuel cell stack constructed as the fourth exemplary embodiment of the present invention, and the fuel cell stack constructed as Comparative Example 2.

Impedance at 700 mA/cm$^2$ was measured, and impedance of a low frequency area representing material transmission characteristics in Comparative Example 2 is much larger than that of the fourth exemplary embodiment. This is because, in a portion in which the circumferential edge protective layer and the MPL are overlapped, the backing layer is inserted into a flow path and thus flow resistance increases.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A membrane electrode assembly (MEA), comprising:
an electrolyte membrane for a fuel cell;
a microporous layer (MPL) that is disposed at a surface of the electrolyte membrane;
a backing layer that is disposed on the MPL; and
a circumferential edge protective layer disposed at a circumferential edge of the electrolyte membrane, the circumferential edge protective layer being located between the backing layer and the electrolyte membrane,
an entire extension of the backing layer along a direction perpendicular to a stacking direction of the MEA being positioned farther inside of the MEA than an entire extension of the electrolyte membrane along the direction perpendicular to the stacking direction of the MEA being positioned farther inside of the MEA, an entire extension of the MPL along the direction perpendicular to the stacking direction of the MEA being positioned farther inside of the MEA than the entire extension of the backing layer along the direction perpendicular to the stacking direction of the MEA.

2. The MEA of claim 1, wherein a side end surface of the circumferential edge protective layer and a side end surface of the MPL contact each other.

3. The MEA of claim 1, wherein a side end surface of the circumferential edge protective layer and a side end surface of the MPL are disposed opposite to each other.

4. The MEA of claim 1, wherein an opening is formed at a center of the circumferential edge protective layer, and the MPL is inserted into the opening.

5. The MEA of claim 1, wherein a catalytic layer is formed between the electrolyte membrane and the MPL, and the catalytic layer is inserted into an opening that is formed at a center of the circumferential edge protective layer.

6. The MEA of claim 5, wherein a thickness of the circumferential edge protective layer is equal to or larger than a sum of thicknesses of the catalytic layer and the MPL.

7. The MEA of claim 5, wherein a cathode catalytic layer is formed on a first surface of the electrolyte membrane, an anode catalytic layer is formed on a second and opposite surface of the electrolyte membrane, and the cathode catalytic layer and the circumferential edge protective layer are overlapped.

8. The MEA of claim 1, wherein an edge of the backing layer directly contacts the circumferential edge protective layer.

9. A fuel cell stack, comprising:
unit cells in which membrane electrode assemblies (MEAs) are disposed at a center and separators are positioned closely adjacent to two opposite sides of the MEAs; and
a pressing plate that presses and supports the unit cells, each MEA comprising:
an electrolyte membrane for a fuel cell;
a microporous layer (MPL) that is disposed at a surface of the electrolyte membrane;
a backing layer that is disposed on the MPL; and
a circumferential edge protective layer disposed at a circumferential edge of the electrolyte membrane, the circumferential edge protective layer being located between the backing layer and the electrolyte membrane,
an entire extension of the backing layer along a direction perpendicular to a stacking direction of the MEA being positioned farther inside of the MEA than an entire extension of the electrolyte membrane along the direction perpendicular to the stacking direction of the MEA being positioned farther inside of the MEA, an entire extension of the MPL along the direction perpendicular to the stacking direction of the MEA being positioned farther inside of the MEA than the entire extension of the backing layer along the direction perpendicular to the stacking direction of the MEA.

10. The fuel cell stack of claim 9, wherein a side end surface of the circumferential edge protective layer and a side end surface of the MPL contact each other.

11. The fuel cell stack of claim 9, wherein a side end surface of the circumferential edge protective layer and a side end surface of the MPL are disposed opposite to each other.

12. The fuel cell stack of claim 9, wherein an opening is formed at a center of the circumferential edge protective layer, and the MPL is inserted into the opening.

13. The fuel cell stack of claim 9, wherein a catalytic layer is formed between the electrolyte membrane and the MPL, and the catalytic layer is inserted into an opening that is formed at a center of the circumferential edge protective layer.

14. The fuel cell stack of claim 13, wherein a thickness of the circumferential edge protective layer is equal to or larger than a sum of thicknesses of the catalytic layer and the MPL.

15. The fuel cell stack of claim 13, wherein a cathode catalytic layer is formed on a first surface of the electrolyte membrane, an anode catalytic layer is formed on a second and opposite surface of the electrolyte membrane, and the cathode catalytic layer and the circumferential edge protective layer are disposed to be partially overlapped.

16. The fuel cell stack of claim 9, wherein an edge of the backing layer directly contacts the circumferential edge protective layer.

17. A membrane electrode assembly (MEA), comprising:
an electrolyte membrane for a fuel cell;
a microporous layer (MPL) that is disposed at a surface of the electrolyte membrane;
a backing layer that is disposed on the MPL; and
a circumferential edge protective layer that is disposed at a circumferential edge of the electrolyte membrane,
an outermost periphery of the microporous layer (MPL) and an innermost periphery of the circumferential edge protective layer being disposed opposite to each other and facing each other, and
an entire extension of the backing layer along a direction perpendicular to a stacking direction of the MEA being positioned farther inside of the MEA than an entire extension of the electrolyte membrane along the direction perpendicular to the stacking direction of the MEA being positioned farther inside of the MEA, an entire extension of the MPL along the direction perpendicular to the stacking direction of the MEA being positioned farther inside of the MEA than the entire extension of the backing layer along the direction perpendicular to the stacking direction of the MEA.

18. A fuel cell stack fabricated with a plurality of the membrane electrode assemblies of claim 17, the fuel cell stack comprising:
unit cells in which the membrane electrode assemblies (MEAs) are disposed at a center and separators are positioned closely adjacent to two opposite sides of the MEAs; and
a pressing plate that presses and supports the unit cells,
the circumferential edge protective layer being located between the backing layer and the electrolyte membrane.

* * * * *